(No Model.) 2 Sheets—Sheet 1.

W. T. BUNN.
Cotton Seed Planter.

No. 242,265. Patented May 31, 1881.

Witnesses:
Howell Bartte.
Floyd Norris

Inventor:
pro William Thomas Bunn
Johnson & Johnson
Attys (No Model.) 2 Sheets—Sheet 2.

W. T. BUNN.
Cotton Seed Planter.

No. 242,265. Patented May 31, 1881.

Witnesses:
Howell Bartle.
Floyd Norris.

Inventor
pro William Thomas Bunn
Johnson and Johnson
attys

UNITED STATES PATENT OFFICE.

WILLIAM T. BUNN, OF HUMBOLDT, TENNESSEE.

COTTON-SEED PLANTER.

SPECIFICATION forming part of Letters Patent No. 242,265, dated May 31, 1881.

Application filed November 18, 1880. (No model.)

*To all whom it may concern:*

Be it known that I, WILLIAM THOMAS BUNN, a citizen of the United States, residing at Humboldt, in the county of Gibson and State of Tennessee, have invented new and useful Improvements in Cotton-Seed Planters, of which the following is a specification.

I have improved the cotton-seed-planter in which the axle of the carrying-wheels passes through the hopper, which is adapted to rise and fall with the wheels independent of the frame which carries the opening and covering devices; and my improvement consists in the combination of the frame having vertical side guides for the axle with the hopper provided with vertical guides arranged to embrace the frame-guides, the dropping-cylinder carried by the axle within the hopper, and the carrying-wheels, whereby the hopper is prevented from rocking upon the axle, while being free to rise and fall with it upon the frame-guides and independent of the frame. The hopper and the seed-dropping part balance each other upon the axle, and the guides for the axle and the guides for the hopper co-operate to allow the hopper and the frame to rise and fall independently of each other and hold the hopper from rocking back and forth upon the shaft during the operation of planting. A cylinder armed with pins forms the dropper and revolves with the shaft within the hopper.

Figure 1:
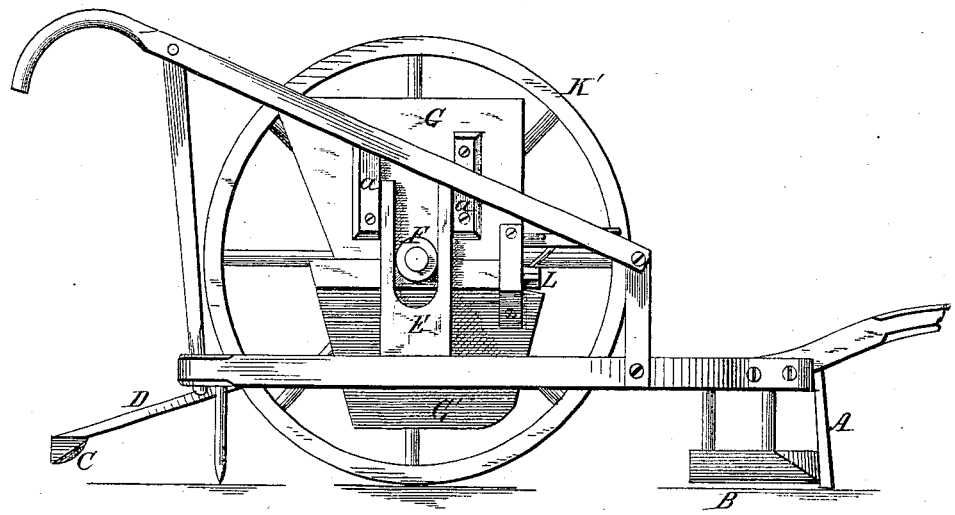
Figures 2, 5:
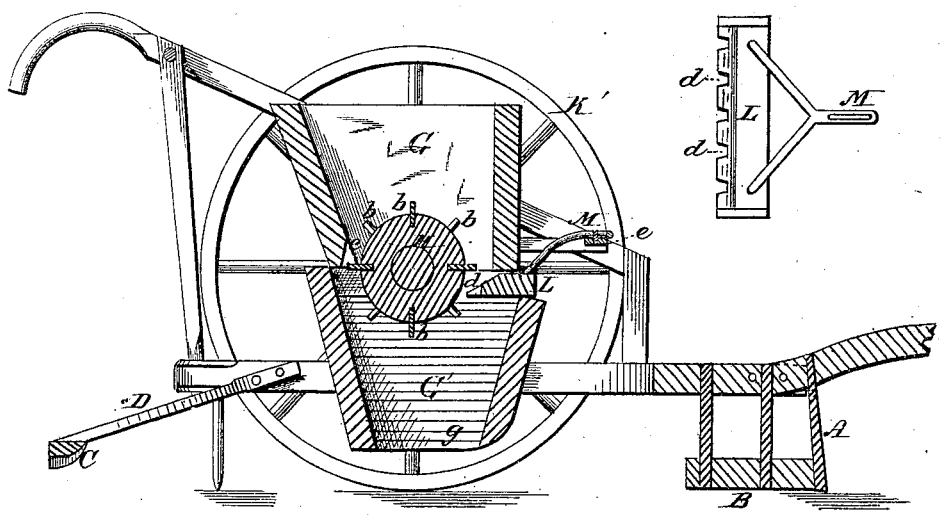
Figure 3:
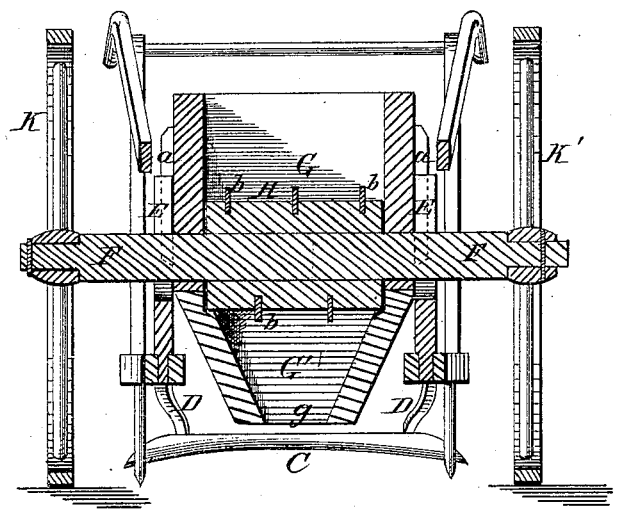
Figure 4:
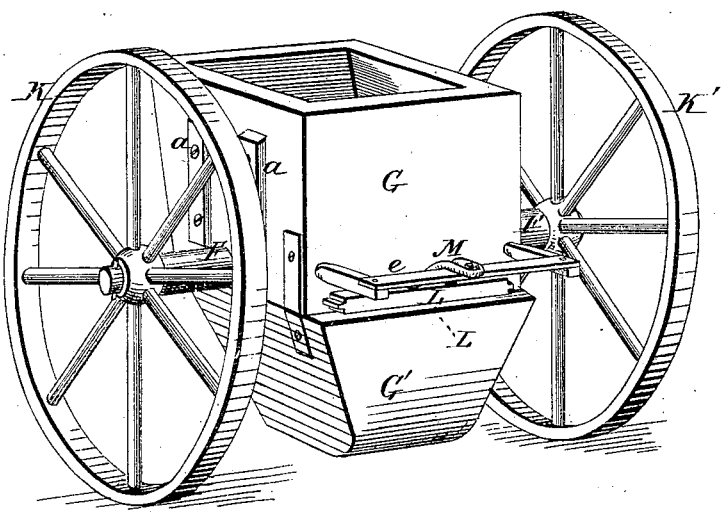

In the accompanying drawings, Figure 1 represents a side elevation of my improved cotton-seed planter; Fig. 2, a vertical longitudinal section thereof; Fig. 3, a vertical section in the line of the axle; Fig. 4, the balanced hopper on the shaft of the carrying-wheels, and Fig. 5 the seed-slide.

The frame is low down, but does not run upon the ground, and it is provided with an opener, A, and a furrow-former, B, in front of the hopper, and a coverer, C, carried by spring-arms D in rear of the hopper. The frame has the usual handles, and is provided with vertical slotted guides E, through which the axle F passes, and by which the frame is connected therewith, so that it may rise and fall with the inequalities of the ground independent of the hopper.

The hopper G has a dropping part, G', and is balanced upon the axle, which passes through it, the dropping part being formed to discharge the seed into the furrow without running in it. The axle passes through the hopper and operates the dropping-cylinder H therein. The hopper is held in place laterally within the frame by the vertical guides E, which are fixed upon each side bar of the frame at a point about the middle of its length. The sides of the hopper next the wheels are provided with vertical guides $a\ a$, arranged to embrace the vertical frame-guides, as shown in Fig. 1, for the purpose of preventing the hopper from rocking upon the axle during the planting operation. As such rocking movement would interfere with the uniform dropping of the seed, and be otherwise objectionable, the co-operation of the guides holds the hopper steady within the frame, while the carrying-wheels control the vertical movements of the hopper without interfering with the proper action of the opening and covering parts of the frame. The bottom of the hopper part G' is rounded for riding over mounds, clods, &c. The dropping-cylinder is armed with pins $b$, and the rear side of the hopper has notches $c$, through which the pins revolve, so that the cylinder is quite close to this side of the hopper, while at the front side it is farther away, to allow the pins to carry down the seed. A slide, L, is fitted in the front of the hopper, so as to extend therein on a line a little below the axis of the cylinder, and which may be adjusted nearer to or farther from the cylinder to regulate the feed of the seed. The inner edge of this slide has notches $d$ corresponding to the pins in the cylinder, so that the pins, in passing through the slide, will carry the seed through the space between the cylinder and the inner edge of the slide, which is beveled, as shown in Fig. 2, to give a free feed of the seed over it. An arm, M, secured to a support, $e$, on the hopper, serves to adjust the slide to the required feed.

The wheel K is loose upon the axle, so that in turning the dropping-cylinder is not revolved.

By changing the construction of the dropping devices the machine may be adapted for dropping corn.

I claim—

In a cotton-seed planter, the combination of the frame having the vertical side guides, E, for the axle, with the hopper G G', provided with the vertical guides *a a*, the axle F, and the carrying-wheels K K', the said hopper-guides being arranged to embrace the frame-guides, substantially as described, for the purpose specified.

In testimony whereof I have hereunto set my hand in the presence of two subscribing witnesses.

WILLIAM THOMAS BUNN.

Witnesses:
M. H. JOHNSON,
J. I. PRUITT.